United States Patent Office 3,169,047
Patented Feb. 9, 1965

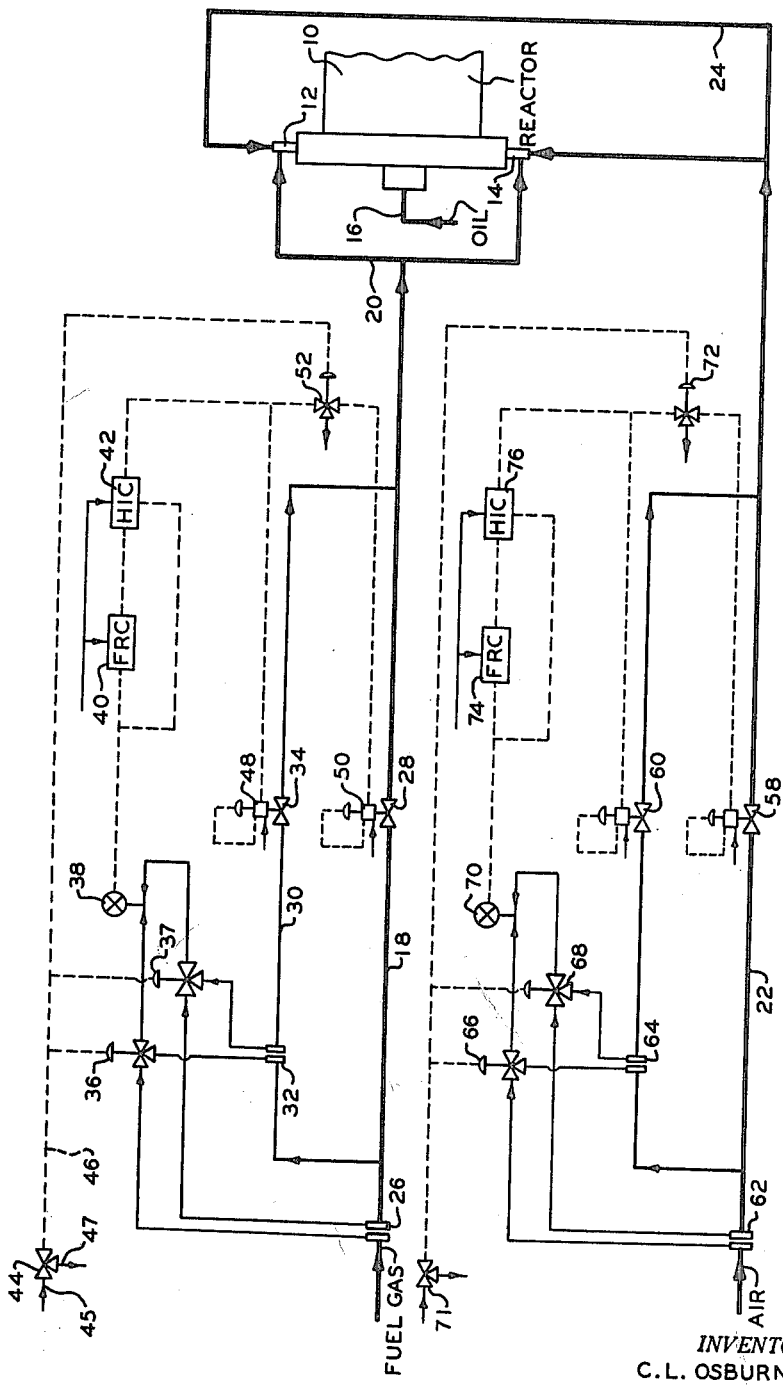
INVENTOR.
C. L. OSBURN, JR.

3,169,047
APPARATUS AND PROCESS FOR CONTROLLING THE GAS FLOW RATE TO A REACTOR
Carl L. Osburn, Jr., Bartlesville, Okla., assignor to Phillips Petroleum Company, a corporation of Delaware
Filed Sept. 18, 1961, Ser. No. 138,664
13 Claims. (Cl. 23—209.4)

This invention relates to a process and arrangement of apparatus for controlling the flow of gas to a process or reactor which necessitates a wide range of flow rates.

The reactors used in the manufacture of carbon black are lined with a high temperature refractory. This refractory fails periodically and has to be replaced approximately every six to eight months. After the refractory is replaced it must be cured. This involves operating with a very low rate of fuel gas and air to the reactor and gradually increasing these flow rates over a period of time to effect the cure. During normal operation the air flow and fuel gas flow to the reactor are at high rates. This invention provides a means of measuring and controlling these low flow rates for curing of the reactor refractories, as well as measuring and controlling the higher flow rates during normal operation. It also provides a means of manually controlling the fuel gas and air at the reactor during the lighting off of the reactor.

While the discussion herein is directed to the application of the invention to the production of carbon black and to carbon black reactors, it should be understood that it is applicable to any process or apparatus which requires the use of an extreme range of flow rates of one or more gases to the process or apparatus. The same type of control is advantageous in the start up firing and/or curing of a boiler or steam generation unit in which the refractories have been replaced or which has been shut down for any reason and requires start up.

Accordingly, it is an object of the invention to provide a process and control system for controlling the flow of gas to a process in which a wide range of flow rates is required. Another object is to provide a process and control system which utilizes the same instrumentation to control low rates of flow as well as high rates of flow. A further object is to provide a process and control system for controlling the flow of air and fuel to a carbon black reactor during lighting off of the reactor or during curing of the reactor refractories after installation thereof. Other objects of the invention will become apparent to one skilled in the art upon consideration of the accompanying disclosure.

A broad aspect of the invention comprises a method of feeding gas to a process at wide range of flow rates varying from a low rate to a relatively high rate, including feeding the gas at relatively low flow rates thru a motor valve of relatively low capacity in a by-pass line around a motor valve of relatively high capacity, positioned in a main gas supply line, at increasing flow rates until the maximum opening of the valve is reached; increasing the flow rate of gas to the process by gradually opening the motor valve in the main supply line to pass an increased flow of gas thru the main line while continuing the flow of gas thru the by-pass line with the motor valve therein fully open.

The control system or arrangement of controls in accordance with the invention is best understood by reference to the accompanying schematic drawing which illustrates the arrangement.

Referring to the drawing, a carbon black reactor 10 is provided with tangential ports 12 and 14 for fuel and air and axial port 16 for an oil feed. A main fuel gas line 18 connects with manifold line 20 which connects with the ports 12 and 14 of the reactor. Similarly, main air supply line 22 connects with the manifold line 24 which leads to ports 12 and 14.

Fuel line 18 is provided with an orifice flow meter 26 and with a motor valve 28. A by-pass line 30 connects with main fuel supply line 18 upstream and downstream of motor valve 28 and is provided with orifice flow meter 32 and motor valve 34. Flow meters 26 and 32 are proportional in size to their respective lines. The control system including a pair of pneumatic 3-way motor valves 36 and 37, a pneumatic differential pressure transmitter 38 and flow recorder controller 40. It may also include a second manually operated pneumatic controller 42. The ports of motor valve 36 are connected by pneumatic lines with the high pressure side of flow meter 26, the high pressure side of flow meter 32, and with transmitter 38. The ports of 3-way motor valve 37 are similarly connected by pneumatic lines with the low sides of flow meters 26 and 32, and with transmitter 38. Valves 36 and 37 are pneumatically operated by reversing hand selecter valve 44 to either connect air supply line 45 with instrument air line 46 or to bleed off pressure from line 46 thru line 47. Valves 36 and 37 are synchronized so that when there is no pressure in instrument air line 46, valve 36 connects the high pressure side of flow meter 32 with transmitter 38 and valve 37 connects the low pressure side of flow meter 32 with transmitter 38. By reversing valve 44 to transmit instrument air pressure to valves 36 and 37, these valves are reversed and transmitter 38 is connected with the high and low pressure sides of flow meter 26. Thus, transmitter 38 can be made sensitive to the flow thru either meter 26 or meter 32 by reversing valve 44.

Flow controller 40 is sensitive to the signal emitted by transmitter 38 and emits a signal to control motor valves 28 and 34. Motor valves 28 and 34 are provided with pneumatic valve positioners 48 and 50 which receive the signal from controller 40 and set the opening of the motor valve in proportion thereto. Positioner 48 is designed to function at a pressure in the range of 3 to 7 pounds so that it opens the valve at 3 pounds and gradually increases the opening thereof to reach the maximum opening of 7 pounds. Positioner 50 on valve 28 begins the opening of the valve at about 7 pounds and is completely open when the pressure signal reaches 15 pounds. The 3-way motor valve 52 is positioned intermediate controller 40 and motor valve 28 and is normally closed so that no pneumatic signal can reach valve 28 until there is instrument air pressure in line 46. This means that only when transmitter 38 is connected with flow meter 26 for high flow rates sensing, is there any possibility of motor valve 28 being open to flow. Motor valves 28 and 34 are normally closed valves.

The air control system is a duplicate of the control system just described on the fuel gas supply. Motor valves 58 and 60 control the flow of air in the main line and in the by-pass line, respectively, and flow meters 62 and 64 sense the flow in these lines. The 3-way motor valves 66 and 68 connect transmitter 70 with flow meter 62 in one position and with flow meter 64 in the reverse position. Hand operated valve 71 controls valves 66 and 68 and, also, valve 72, to cut off and to pass instrument air to motor valve 58. Flow controller 74 is responsive to the signal from transmitter 70 and is in control of motor valves 58 and 60. Manually operated indicating controller 76 is positioned in series with flow controller 74.

In starting up the reactor, it is feasible to manually set or operate either instrument 40 or instrument 42, in case the latter is included in the control system. Instrument 40 is a recorder so that the strength of the signal from transmitter 38 is readable. In an actual plant installation, controllers 40 and 74 are located on a panel in the main control room for a series of reactors. Controllers 42 and 76 are positioned at the individual reactor being controlled, so that the operator can better observe the start-up operation. The start-up utilizing controllers 42 and 76 will be described but it is to be understood that the same procedure can be followed by utilizing controls 40 and 74 in the main control room.

The manual control on instruments 42 and 76 is moved in each instance to slightly above 3 pounds so as to slightly open valves 34 and 60 and the ignitor in reactor 10 ignites the combustible mixture entering the reactor. After ignition, the setting of manual controllers 42 and 76 is periodically or gradually changed to increase the pressure signal on motor valves 34 and 60 until a pressure signal of about 7 pounds is reached at which stage valves 34 and 60 are completely open for maximum flow rates to the reactor. This period may take anywhere from about one-half hour to a day, depending upon the character of the refractories being cured or the nature of the startup. After reaching maximum flow rates thru valves 34 and 60, valves 44 and 71 are reversed to supply instrument air to valves 36, 37, 66, 68, 52, and 72 which makes transmitters 38 and 70 sensitive to flow meters 26 and 62, respectively. Controls 42 and 76 are then set at gradually increasing pressures above 7 pounds so as to open valves 28 and 58 and increase the flow of fuel and air to the reactor. By gradually raising the setting of instruments 42 and 76, the flow rates are brought up to the maximum desired over any selected desired period and oil is fed to the reactor to initiate the carbon black forming process.

When the reactor has been brought up to temperature by means of the control system operated by controllers 42 and 76, these instruments are switched to automatic control and automatic controllers 40 and 74 are set for the pressure maintained by controllers 42 and 76 at the times of the switch. Controllers 40 and 74 then automatically control and maintain the desired gas flow rates in fuel lines 18 and 22.

In the system illustrated in the drawing and utilized in the carbon black plant, the flow thru motor valves 28 and 34 are in a ratio of approximately 12 to 1. When these valves are fully open, the system is applicable to other ratios of flow thru the main supply line to flow thru the by-pass line, such as the range of 5:1 to 20:1; and, of course, motor valves 34 and 28 may be made responsive to other pressures than those applied in the specific illustration. However, the pressure at which valve 28 opens should be about the same as the pressure at which valve 34 is fully open.

Certain modifications of the invention will become apparent to those skilled in the art and the illustrative details disclosed are not to be construed as imposing unnecessary limitations on the invention.

I claim:

1. Apparatus for controlling a wide range of gas flow to a reactor comprising in combination; a high capacity main gas supply line having a first orifice flow meter therein and a first motor valve therein of relatively high flow capacity downstream of said first meter; a bypass line of lesser capacity in said main gas line around said first motor valve downstream of said first meter; a second orifice flow meter in said bypass line; a second motor valve of relatively low flow capacity in said bypass line downstream of said second meter; a first 3-way motor valve; a second 3-way motor valve; a differential pressure transmitter; a first signal transmission line leading from the high pressure side of said first meter to a first port of said first 3-way valve; a second signal transmission line leading from the high pressure side of said second meter to a second port in said first 3-way valve; a first signal receiving line leading from a third port in said first 3-way valve to said transmitter, whereby said transmitter may receive signals from the high pressure side of either aforesaid meter; a third signal transmission line leading from the low pressure side of said first meter to a first port in said second 3-way valve; a fourth signal transmission line leading from the low pressure side of said second meter to a second port in said 3-way valve; a second signal receiving line leading from a third port in said second 3-way valve to said transmitter, whereby said transmitter may receive signals from the low pressure side of either of aforesaid meters; reversible means for operating said first and second 3-way valves to alternately operatively connect said transmitter with the high and low pressure side of said first meter and with the high and low pressure side of said second meter; and a flow controller connected to receive a signal from said transmitter and with said first and second motor valves to transmit a signal thereto.

2. The apparatus of claim 1 including means intermediate said flow controller and said first motor valve responsive to said reversible means for blocking the signal from said controller to said first motor valve when said transmitter is connected with said second meter.

3. The apparatus of claim 1 including a second manually operable controller in series with said flow controller.

4. Apparatus for controlling a wide range of gas flow to a reactor comprising in combination a main gas supply line of relatively high capacity having a first orifice flow meter therein and a first motor valve of relatively high flow capacity therein downstream of said first meter; a bypass line of relatively low capacity connecting with said main line intermediate said first meter and said first motor valve and downstream of said first motor valve; a second orifice flow meter in said bypass line; a second motor valve of relatively low flow capacity in said bypass line downstream of said second meter; a differential pressure transmitter; reversible means for alternately connecting said transmitter first with the high and low pressure sides of said first meter and then with the high and low pressure sides of said second meter; means for reversing said reversible means; a flow controller connected to receive the signal from said transmitter and emit a control signal to said first motor valve and to said second motor valve, said second motor valve being actuatable by a signal of a strength in a relatively weak range and said first motor valve being actuatable by a signal of a strength in a next higher range.

5. The apparatus of claim 4 including means intermediate said controller and said first motor valve responsive to said reversible means for blocking the signal from said controller to said first motor valve when said transmitter is connected with said second meter.

6. The apparatus of claim 4 wherein said reversible means comprises a first 3-way motor valve, its three ports being connected by pneumatic lines with the high pressure side of said first meter, with the high pressure side of said second meter, and with said transmitter; a second 3-way motor valve correspondingly connected with the low pressure sides of said first and second meters and with said transmitter, said 3-way valve being coordinated so that in one position thereof said transmitter is sensitive to the differential pressure at said first meter and in the other position said transmitter is sensitive to the pressure differential across said second meter.

7. The apparatus of claim 6 wherein said 3-way motor valves are pneumatically operated by a common instrument air system having an air supply valve, said 3-way motor valves being in one said position when supplied with instrument air and in the other position when said air is cut off; said first and second motor valves have pneumatic valve positioners and are normally closed, said second motor valve starting to open at about 3 pounds pressure and being fully open at about 7 pounds pressure and said first motor valve starting to open at about 7 pounds pressure and being fully open at 15 pounds pressure, said controller being adapted to emit an air signal in the range of 3 to 15 pounds.

8. Apparatus comprising in combination, a carbon black reactor having separate air, fuel gas, and oil inlets; an air supply line connected with the air inlet of said reactor and being provided with the control apparatus of claim 4; a fuel gas supply line connected with the fuel gas inlet of said reactor and being provided with the control apparatus of claim 4; and an oil supply line connected with the oil inlet of said reactor.

9. A method of feeding a gas to a process at a wide range of flow rates varying from a low rate to a relatively high rate which comprises feeding said gas at increasing flow rates in a relatively low range thru a first motor valve of relatively low capacity in a bypass line around a second motor valve of relatively high capacity in a main gas supply line until about the full flow capacity of said first valve is reached; thereafter, while passing gas thru said bypass line at said full capacity, passing additional gas thru said second valve at gradually increasing flow rates from a low to a high rate of flow until a desired total flow rate is reached.

10. The method of claim 9 wherein the full flow rate thru said first motor valve is in the range of about $1/20$ to $1/5$ of the full flow rate thru said second valve.

11. The apparatus of claim 1 wherein said first and second 3-way valves are actuated by air pressure from a common instrument air line containing a 3-way control valve which introduces instrument air to said common line when in one position and cuts off and bleeds air from said common line in the other position; said first 3-way valve connects the high pressure side of said first meter with said transmitter and said second 3-way valve connects the low pressure side of said first meter when instrument air is applied thru said common line; and said first and second 3-way valves are reversed when instrument air is bled off said common line.

12. The apparatus of claim 11 including an air operated valve intermediate said flow controller and said first motor valve operatively connected with said common air line so as to cut off the signal from said controller to said first motor valve when there is no instrument air pressure in said air line.

13. A method of gradually heating up a carbon black reactor after shut-down which comprises feeding separate streams of air and fuel gas in combustion-supporting proportions to form a mixture therein; burning said mixture; separately feeding each said stream to said reactor at increasing flow rates in a relatively low range thru a first motor valve of relatively low capacity in a by-pass line around a second motor valve of relatively high capacity in a main supply line until about the full flow capacity of said first valve has been reached; thereafter, while passing each said stream thru its respective by-pass at said full capacity, passing additional gas thru said second valve at gradually increasing flow rates from a relatively low to a relatively high rate until a desired total flow rate is reached and said reactor is heated to operating temperature; and thereafter feeding a suitable oil feed for carbon black formation to said reactor while at operating temperature along with combustion air so as to form carbon black.

References Cited in the file of this patent
UNITED STATES PATENTS

| | | |
|---|---|---|
| 1,108,721 | Dodge | Aug. 25, 1914 |
| 1,934,948 | Perrine | Nov. 14, 1933 |
| 2,883,271 | Pennington et al. | Apr. 21, 1959 |